No. 768,951. PATENTED AUG. 30, 1904.
W. S. RAWSON.
HIGH PRESSURE FILTER.
APPLICATION FILED AUG. 21, 1903.
NO MODEL. 2 SHEETS—SHEET 1.
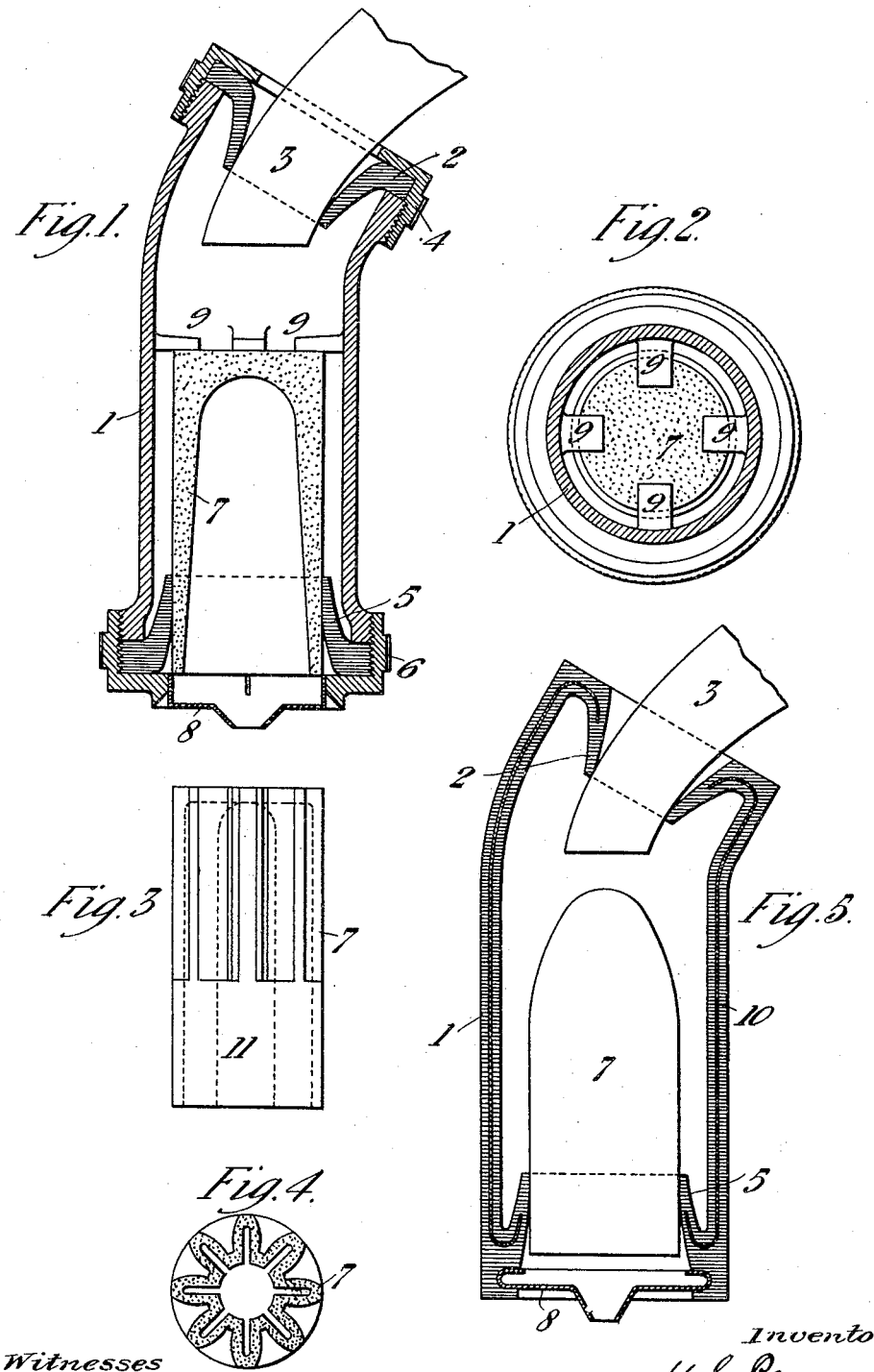

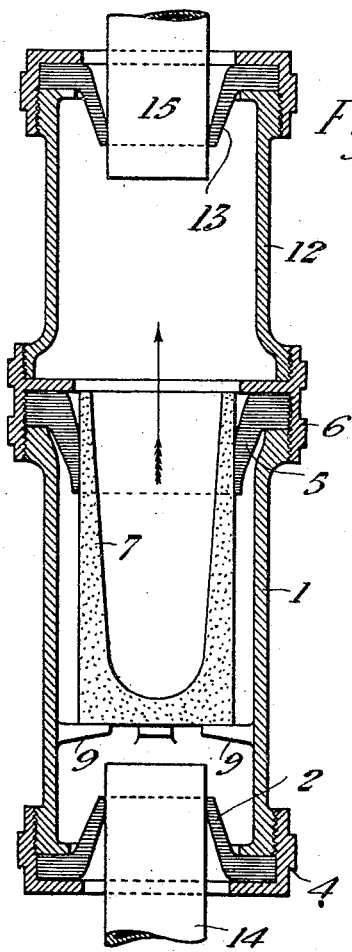
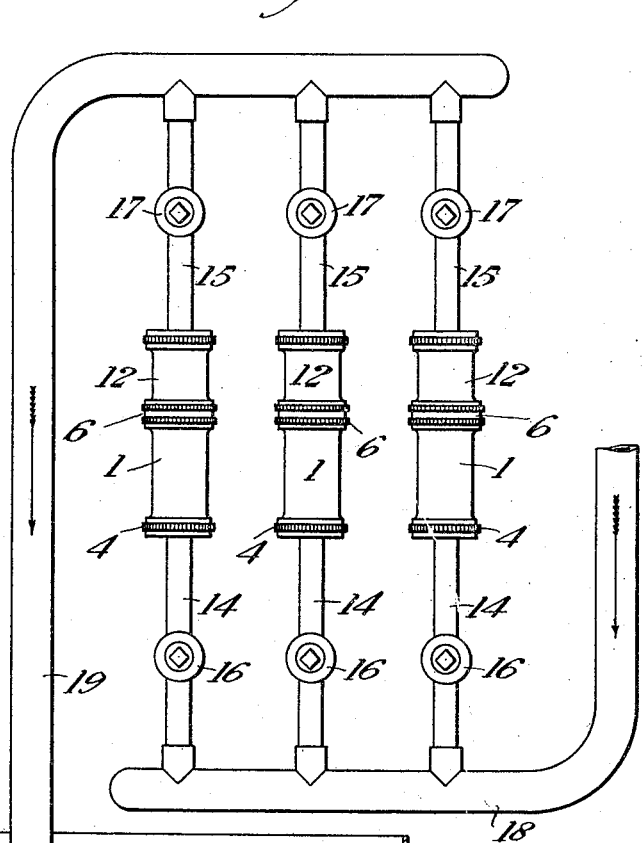

No. 768,951.

Patented August 30, 1904.

UNITED STATES PATENT OFFICE.

WILLIAM STEPNEY RAWSON, OF LONDON, ENGLAND.

HIGH-PRESSURE FILTER.

SPECIFICATION forming part of Letters Patent No. 768,951, dated August 30, 1904.

Application filed August 21, 1903. Serial No. 170,251. (No model.)

*To all whom it may concern:*

Be it known that I, WILLIAM STEPNEY RAWSON, a subject of the King of Great Britain and Ireland, residing at 25 Victoria street, London, England, have invented a certain new and useful Improved High-Pressure Filter, of which the following is a specification, for which I have applied for a patent in Great Britain, dated the 29th of May, 1903, No. 12,297.

This invention relates to an improved high-pressure filter which can be readily attached to existing taps, the special object of the present invention being to facilitate the removal of the filtering medium for cleansing or replacement. These objects are obtained by the employment of the well-known principle of a rubber cone, the mouth of which is somewhat smaller than the cylinder upon which it makes a joint, which joint is made more perfect by the pressure of the water upon the outer surface of the rubber cone.

In the accompanying drawings is illustrated a high-pressure filter constructed according to this invention. Figure 1 being a vertical section, Fig. 2 a transverse section. Figs. 3 and 4 represent an elevation and cross-section of the filtering-block, and Fig. 5 a sectional elevation of a modified construction of filter. Fig. 6 shows a sectional elevation of a further modified construction, and Fig. 7 an elevation showing the application of this form for enabling filtering on a large scale.

The filter consists of a cylinder 1, of suitable material, to the upper end of which is attached a rubber cone 2, secured in position by a screwed cap 4, projecting inward and having an opening somewhat smaller than the cylindrical mouth 3 of the tap to which the filter is to be attached. To the other end of the cylinder 1 is also attached another rubber cone, 5, secured by a screwed cap 6, projecting inward and having an opening somewhat smaller than the block of filtering material 7, which is to be held in position by this cone. This block of filtering material 7 is preferably formed as a hollow cylindrical cup having a perfectly smooth surface 11 where it is gripped by the rubber cone 5; but its upper surface may be corrugated, as shown at Figs. 3 and 4, in order to increase the filtering-surface. The cylinder 1 is preferably provided with projections 9 to regulate the distance to which the filtering-plug can be pushed in. Although this block may be made of any suitable filtering material, it is preferred to mold it of ground calcined magnesite together with suitable binding material, and baked to a suitable temperature. In order to conveniently collect the water issuing from the cylinder into a single stream, a metal or porcelain cup 8 with a suitably-formed nozzle may be attached to the end of the cylinder.

According to the construction shown in Fig. 5 the cylinder 1 is preferably made entirely of india-rubber strengthened by canvas 10, inserted in the rubber, except at the cone-joints 2 and 5.

According to the construction shown in Fig. 6 the cylinder 1 is provided with an extra portion 12, screwed into the cap 6 and provided with another rubber cone, 13. By means of the cone 13 at one end and the cone 2 at the other end the filter can be rapidly attached between an intake-pipe 14 and an outflow-pipe 15. By the use of this construction a number of separate units mounted, respectively, between a supply-pipe 18 and an outlet-pipe 19 may be joined together in one system, as shown in Fig. 7. Each unit is provided with taps 16 and 17, controlling the inflow and outflow, so that any one of the units can be detached for cleaning purposes without interfering with the flow of the others. The liquid conveyed by the pipe 18 enters the intake-pipes 14 under pressure, filters up through the filtering-block 7, through the outflow-pipes 15 into the pipe 19, by which it can be conducted into any required receptacle.

When the filter is fixed in position and the water is turned on, the pressure of the water entering the cylinder effects a perfectly-tight joint between the cones and the smooth surface of the filtering material and between the cone or cones and the connecting-pipes; but when the water is turned off and the pressure is relieved the plug of filtering material can be easily withdrawn for the purpose of cleansing or replacing, and the whole filter can be readily disconnected. When it is desired to cleanse the filtering-plug, this is simply withdrawn from the holder and is inserted in the reverse position, so that on turning on the tap the water passes through it in the reverse direction, thus mechanically cleansing it. During this operation it is advisable in the case of a filtering-plug formed as shown in Figs. 3 and 4 to hold the plug in position by hand if corrugated as above described, because the grip of the rubber cone is less powerful than when the plug is inserted in the normal direction. This mechanical cleansing is quite distinct from the bacteriological sterilizing, which can be effected by taking the plugs out of position and boiling them for a certain time or by other means.

Having thus described the nature of this invention and the best means I know of carrying the same into practical effect, I claim—

1. A filter for liquids under pressure comprising a cylindrical vessel, a conical india-rubber sleeve secured at its base to one end of the vessel and adapted to be held closed round an inlet-pipe by the pressure of the fluid to be filtered, a hollow block of filtering material inside the cylindrical vessel and closed toward the inlet-pipe, and a second conical india-rubber sleeve secured at its base to the said cylindrical vessel and adapted to be held closed round the filtering-block by the pressure of the liquid, substantially as described.

2. A filter for liquids under pressure comprising a cylindrical vessel into which the fluid under pressure is delivered, conical india-rubber sleeves attached by their bases to the cylindrical vessel and projecting into the said vessel and a hollow block of filtering material closed at one of its ends and secured inside the cylindrical vessel between stops fixed inside the said vessel and one of the conical india-rubber sleeves, substantially as described.

3. A filter for liquids under pressure, comprising a cylindrical vessel into which the fluid under pressure is delivered, conical india-rubber sleeves secured at their bases by means of nuts screwed on the cylindrical vessel, and a cored cylindrical block of filtering material of smaller diameter than the internal diameter of the cylindrical vessel, and secured within the said vessel between stops projecting from the inside thereof, and one of the conical india-rubber sleeves, substantially as described.

4. A filter for liquids under pressure comprising a cylindrical vessel, conical india-rubber sleeves secured at their bases by means of nuts screwed on either end respectively of the cylindrical vessel, a collecting cap and nozzle removably fitted in one of the said nuts, and a cored cylindrical block of filtering material inside the cylindrical vessel and opening into the said cap and nozzle; substantially as described.

5. A filter for liquids under pressure comprising a cylindrical vessel into which the fluid under pressure is delivered, conical india-rubber sleeves secured at their bases by means of nuts screwed on either end respectively of the cylindrical vessel, and a cylindrical cup of filtering material secured within the said vessel between stops projecting from the inside thereof with its closed end toward the fluid-inlet, and a conical india-rubber sleeve secured at its base to the cylindrical vessel; substantially as described.

6. A filter for liquids under pressure comprising a cylindrical vessel into which the fluid under pressure is delivered, conical india-rubber sleeves secured at their bases by means of nuts screwed on either end respectively of the cylindrical vessel, and a cylindrical cup of filtering material inside the said vessel having its closed end toward the fluid-inlet abutting against stops projecting from the inside thereof and supported coaxially with the cylindrical vessel by a conical india-rubber sleeve which is secured at its base to the said vessel and encircles the open end of the filtering-cup; substantially as described.

7. A filter for liquids under pressure comprising a cylindrical vessel into which the fluid under pressure is delivered, conical india-rubber sleeves secured at their bases by means of nuts screwed on either end respectively of the cylindrical vessel, and a cylindrical cup of filtering material fluted lengthwise through part of its length secured within the said cylindrical vessel between stops projecting therefrom with its bottom toward the fluid-inlet, and a conical india-rubber sleeve secured to the cylindrical vessel; substantially as described.

In testimony whereof I have signed my name to this specification in the presence of two subscribing witnesses.

WILLIAM STEPNEY RAWSON.

Witnesses:
 EDWARD GARDNER,
 OLIVER IMRALL.